(12) United States Patent
Nakamura et al.

(10) Patent No.: US 10,768,641 B2
(45) Date of Patent: Sep. 8, 2020

(54) FLOW DIVIDING SYSTEM

(71) Applicant: FUJIKIN INCORPORATED, Osaka, Osaka (JP)

(72) Inventors: Takeshi Nakamura, Osaka (JP); Yoshitomo Kanai, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 15/755,199

(22) PCT Filed: Aug. 11, 2016

(86) PCT No.: PCT/JP2016/073685
§ 371 (c)(1),
(2) Date: Feb. 26, 2018

(87) PCT Pub. No.: WO2017/033757
PCT Pub. Date: Mar. 2, 2017

(65) Prior Publication Data
US 2018/0246532 A1    Aug. 30, 2018

(30) Foreign Application Priority Data

Aug. 26, 2015    (JP) ................. 2015-167259

(51) Int. Cl.
*G05D 7/06* (2006.01)
*F16K 27/00* (2006.01)
*G05D 11/13* (2006.01)

(52) U.S. Cl.
CPC ........... *G05D 7/0635* (2013.01); *F16K 27/00* (2013.01); *F16K 27/003* (2013.01);
(Continued)

(58) Field of Classification Search
CPC ................ G05D 7/0664; G05D 11/132; Y10T 137/87885; F16K 27/003
See application file for complete search history.

(56) References Cited

U.S. PATENT DOCUMENTS 5,988,217 A    11/1999 Ohmi et al.
6,640,835 B1 *    11/2003 Rohrberg .............. F16K 27/003
137/884
(Continued)

FOREIGN PATENT DOCUMENTS

JP    10-148272    6/1998
JP    2002-349797    12/2002
(Continued)

*Primary Examiner* — Kevin F Murphy
(74) *Attorney, Agent, or Firm* — Venable LLP

(57) ABSTRACT

To provide a flow dividing system that has an improved degree of freedom in arrangement, is suitable for integration, and achieves reductions in the manufacturing costs and maintenance costs. A flow dividing system for controlling, upon dividing a single flow rate into multiple flow rates, the respective flow rates such that the ratio between the divided flow rates matches a preset flow rate ratio. The flow dividing system has: a manifold 500 for dividing the single flow rate into the multiple flow rates; and multiple fluid control devices 1M, 1S that are formed as separate bodies from the manifold 500, are disposed separately from and independently of each other, and respectively control the multiple flow rates. A master device 1M has communication unit 102M for transmitting a preset flow rate value based on the preset flow rate ratio to a slave device 1S and for receiving a flow rate detection value DQ2 from the slave device 1S, and the slave device 1S has a communication unit 102S for receiving the preset flow rate value from the master device 1M and for transmitting the flow rate detection value DQ2 to the master device 1M.

13 Claims, 14 Drawing Sheets

(52) U.S. Cl.
CPC ......... *G05D 7/0664* (2013.01); *G05D 11/132* (2013.01); *Y10T 137/87885* (2015.04)

(56) References Cited

U.S. PATENT DOCUMENTS

| | | | |
|---|---|---|---|
| 8,849,466 B2* | 9/2014 | Ding | ................ C23C 16/45561 137/101 |
| 2002/0185185 A1 | 12/2002 | Yamaji et al. | |
| 2007/0240778 A1 | 10/2007 | L'Bassi et al. | |
| 2015/0059859 A1 | 3/2015 | Takahashi et al. | |

FOREIGN PATENT DOCUMENTS

| | | |
|---|---|---|
| JP | 2015-049569 | 3/2015 |
| WO | 2005/008107 | 1/2005 |

* cited by examiner

[Fig. 1A]
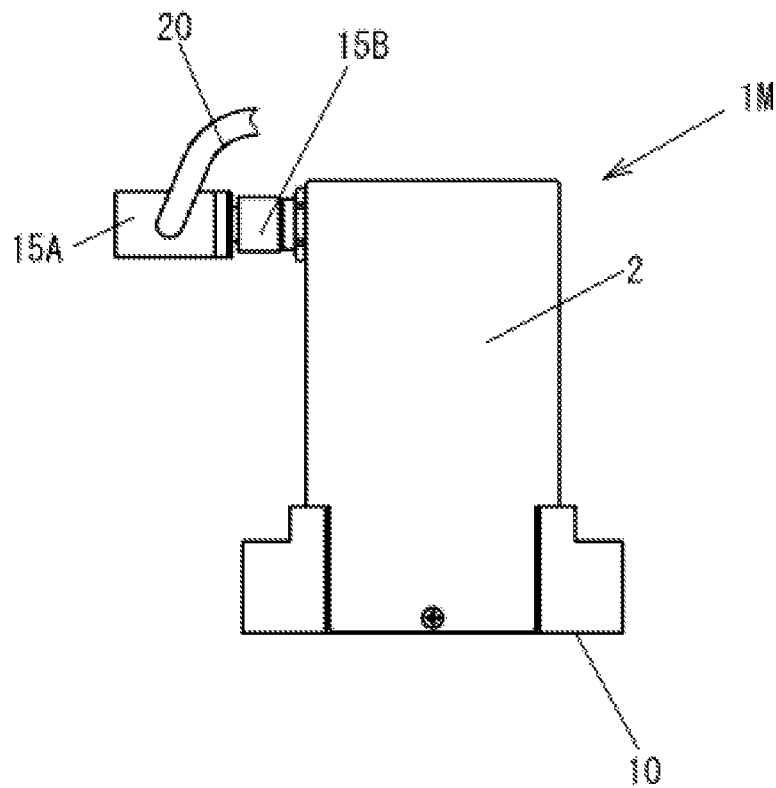
[Fig. 1B]
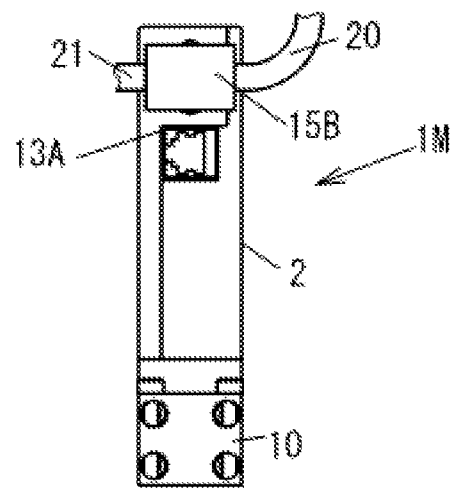

[Fig. 1C]
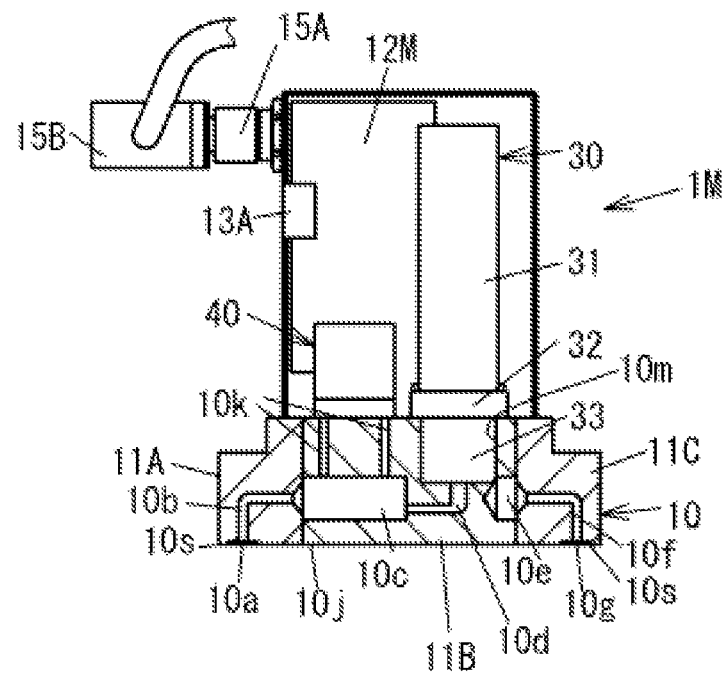
[Fig. 1D]
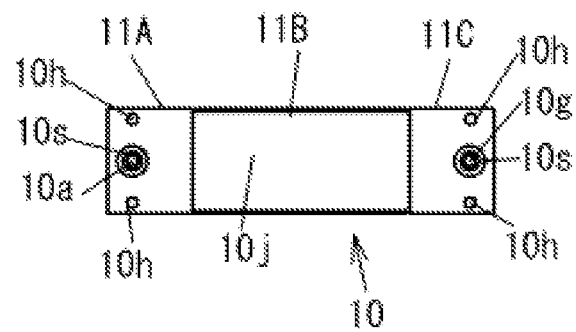

[Fig. 2A]
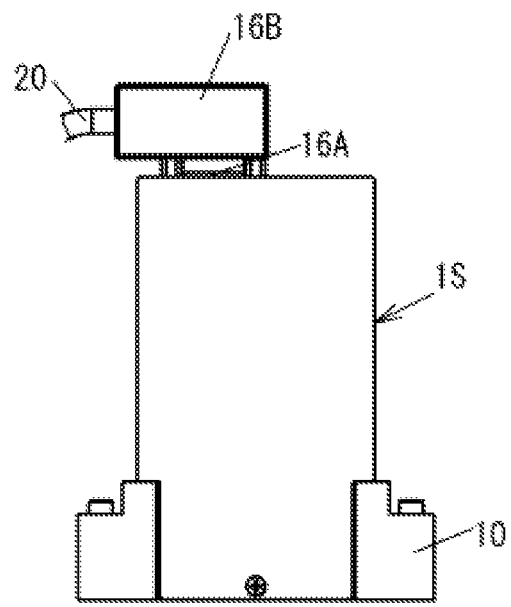
[Fig. 2B]
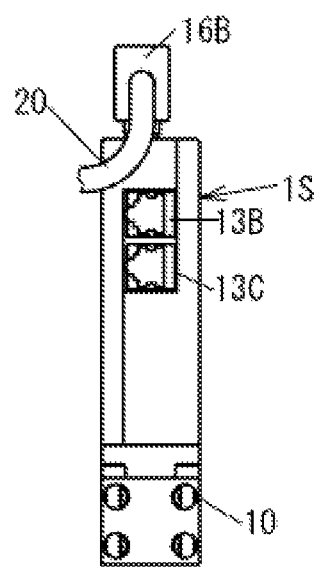

[Fig. 2C]
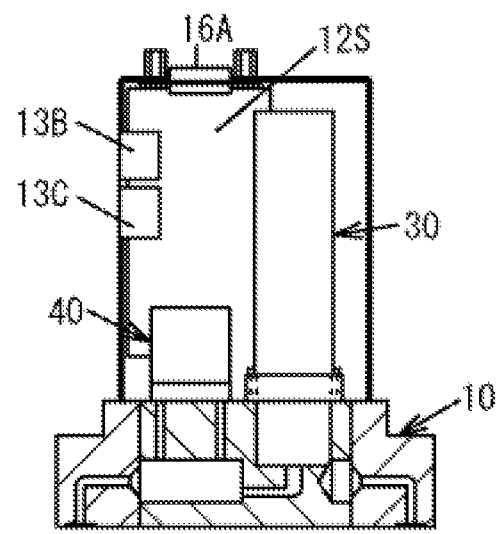

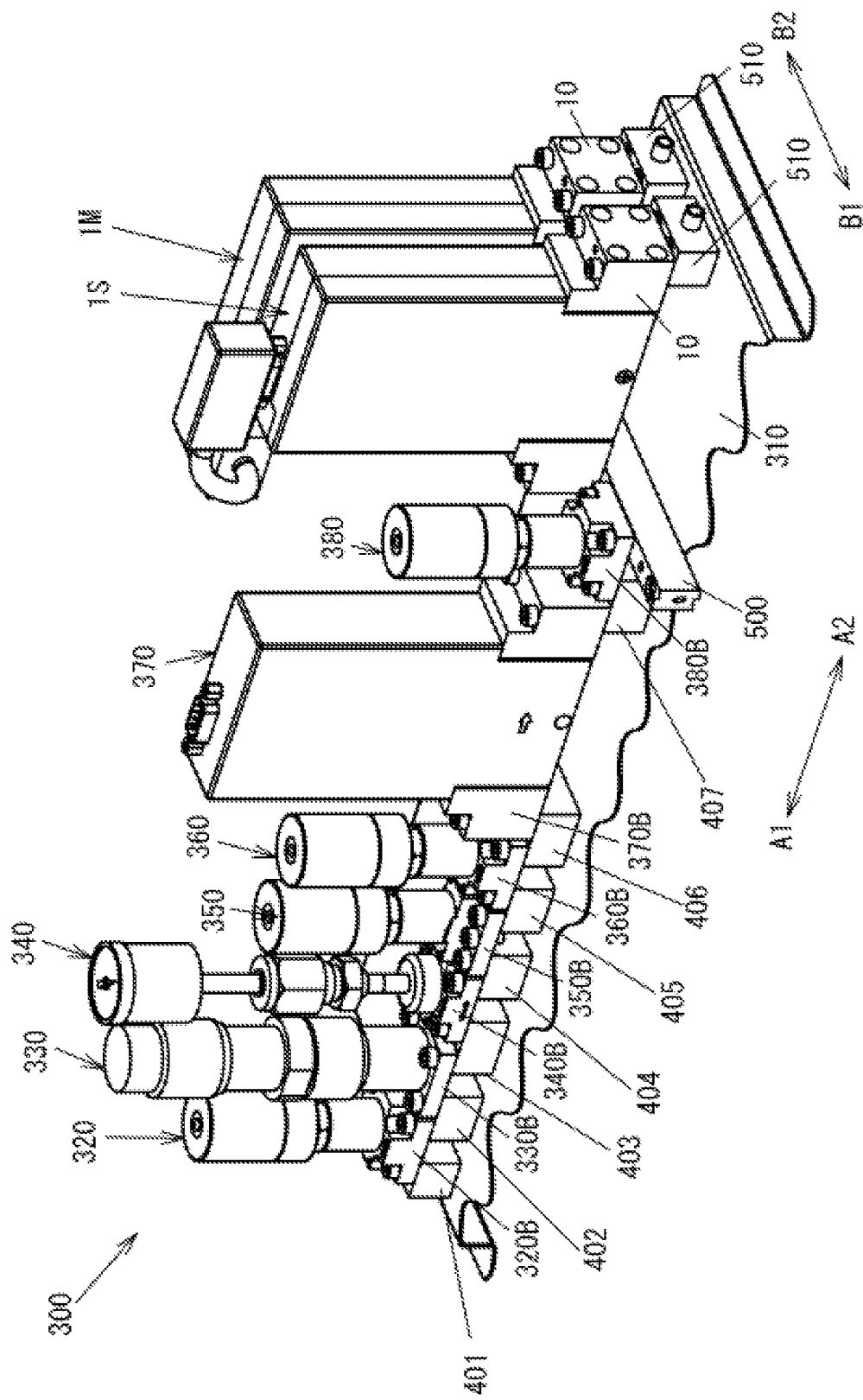
[Fig. 3A]

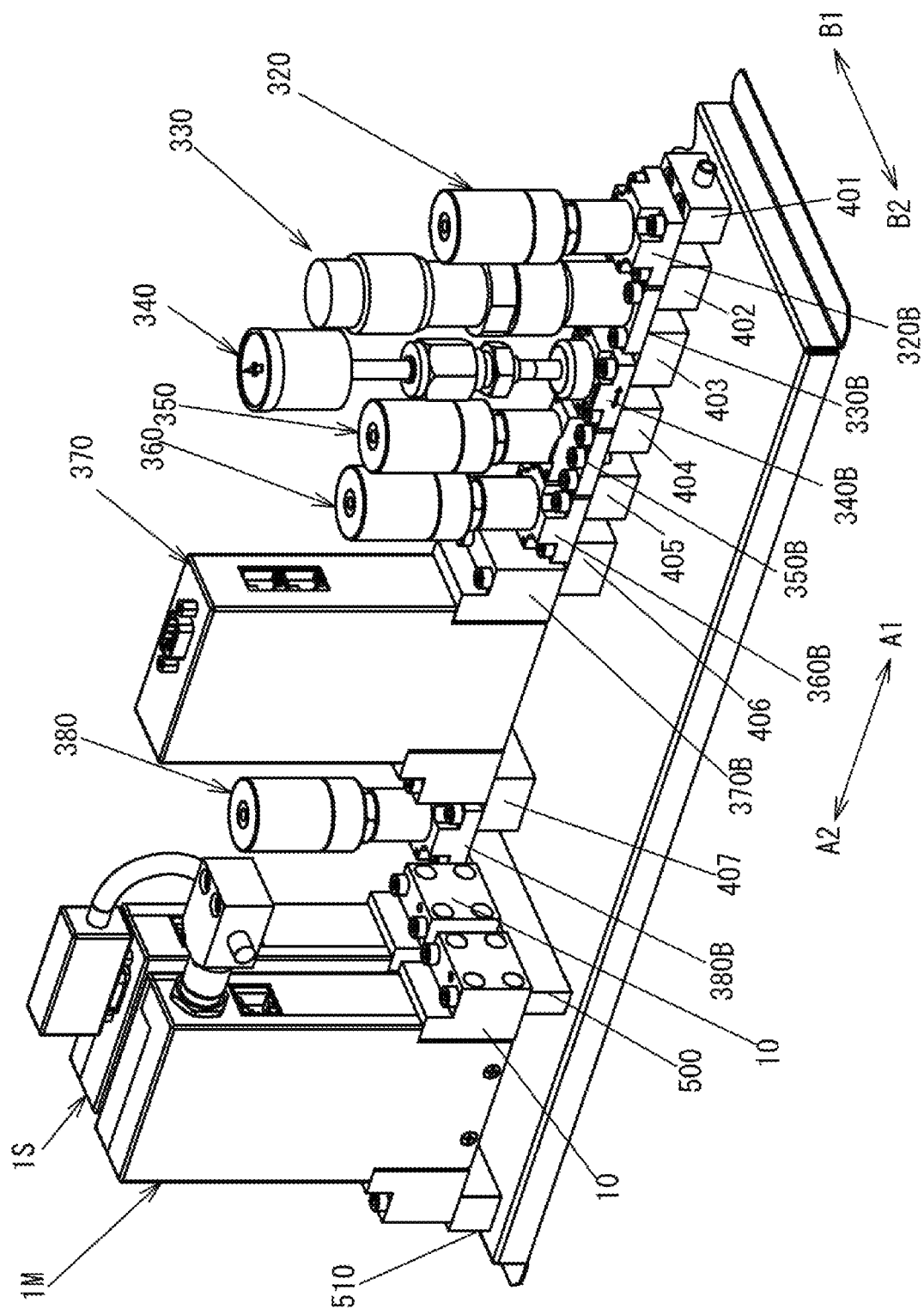

[Fig. 4A]
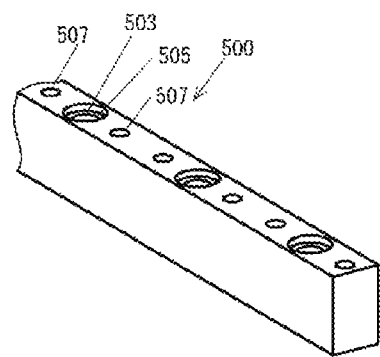
[Fig. 4B]
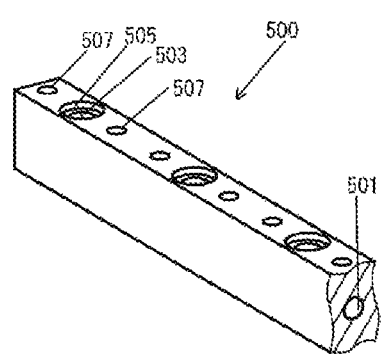
[Fig. 4C]
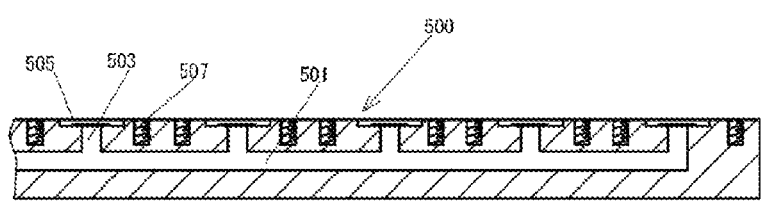

[Fig. 5]
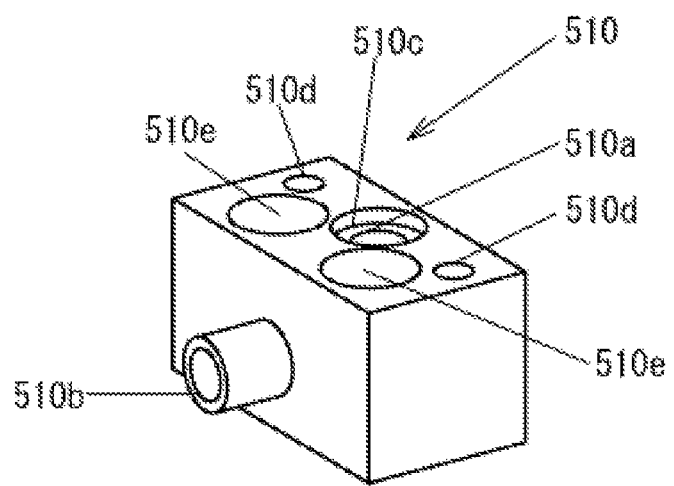

[Fig. 6]
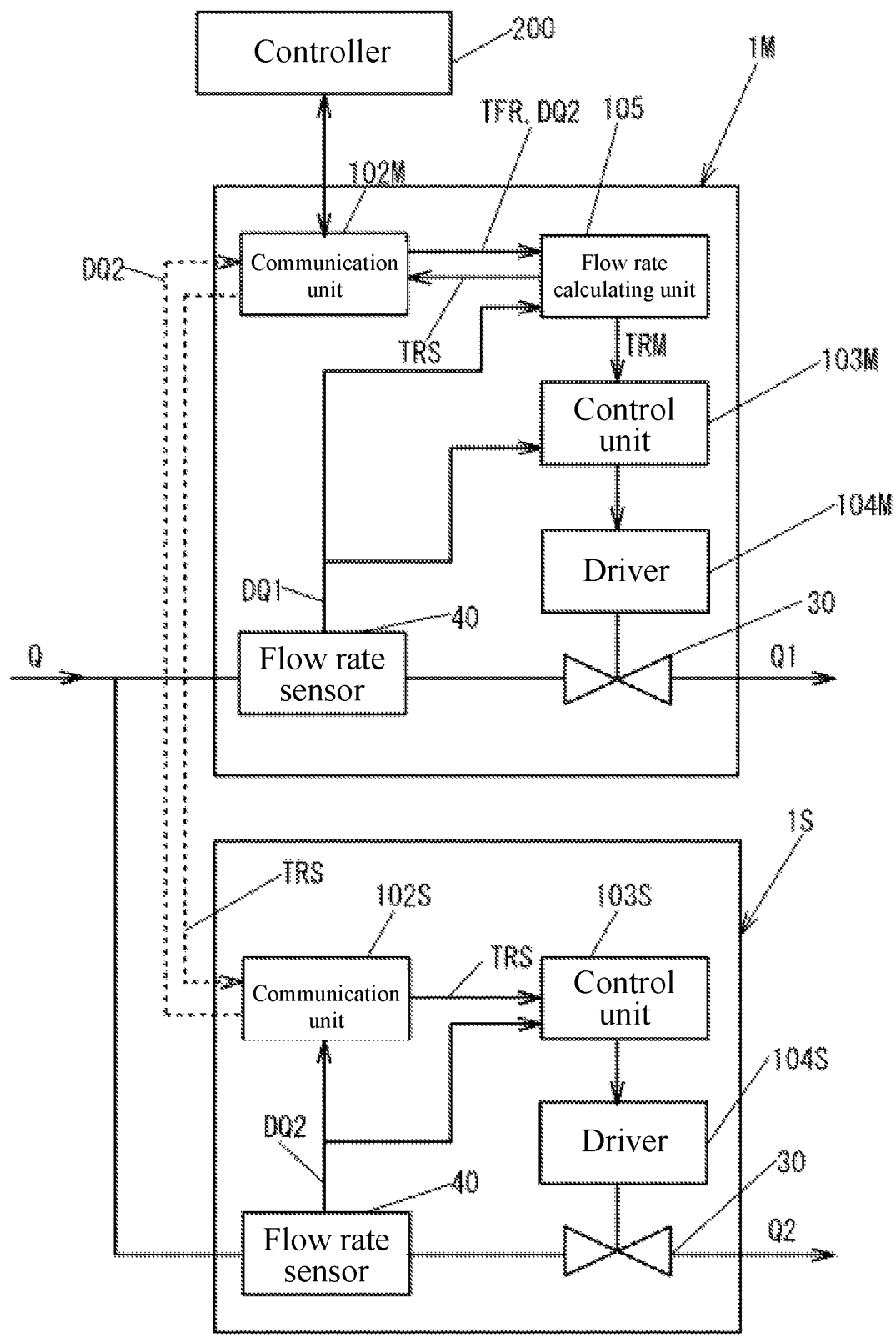

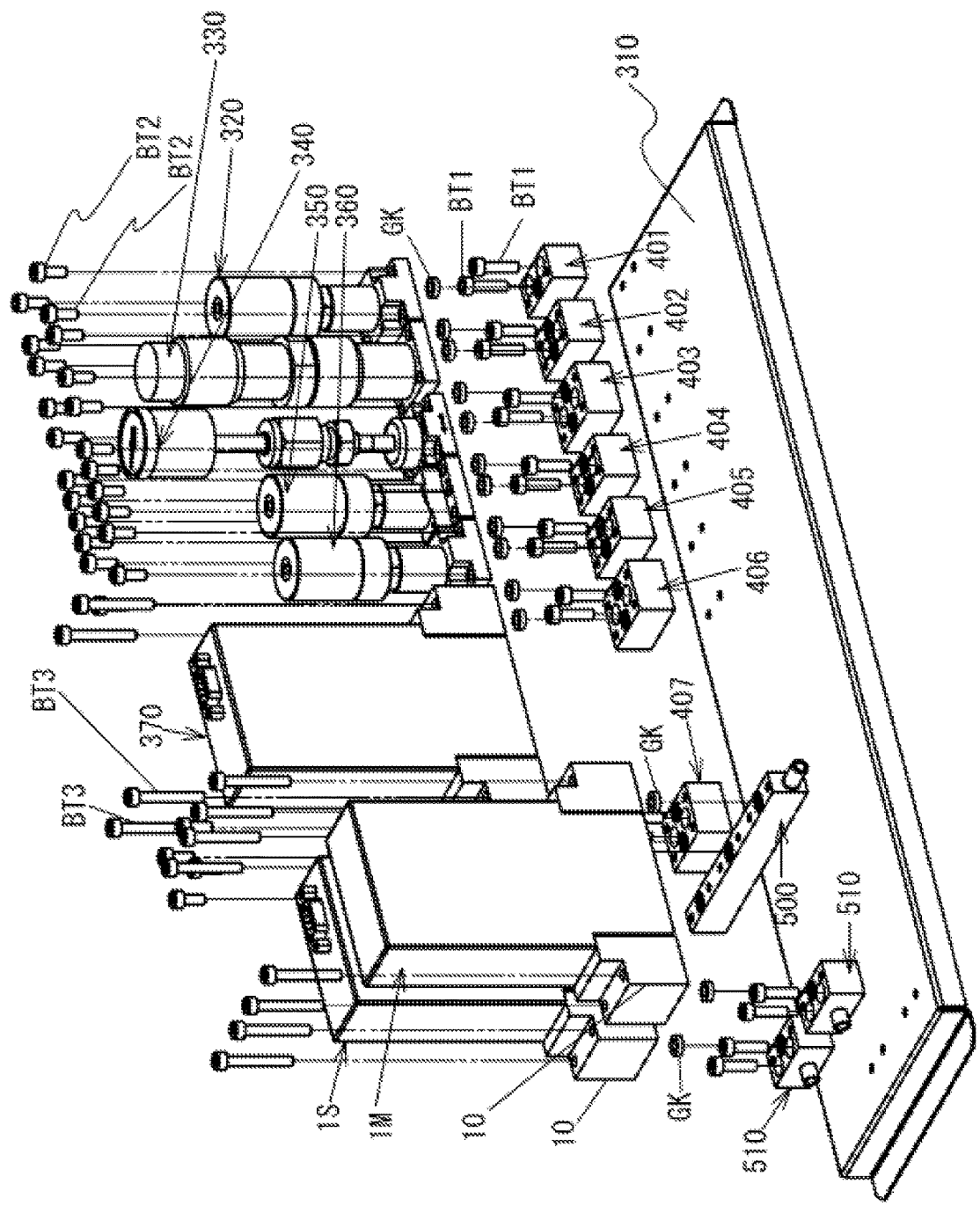
[Fig. 7]

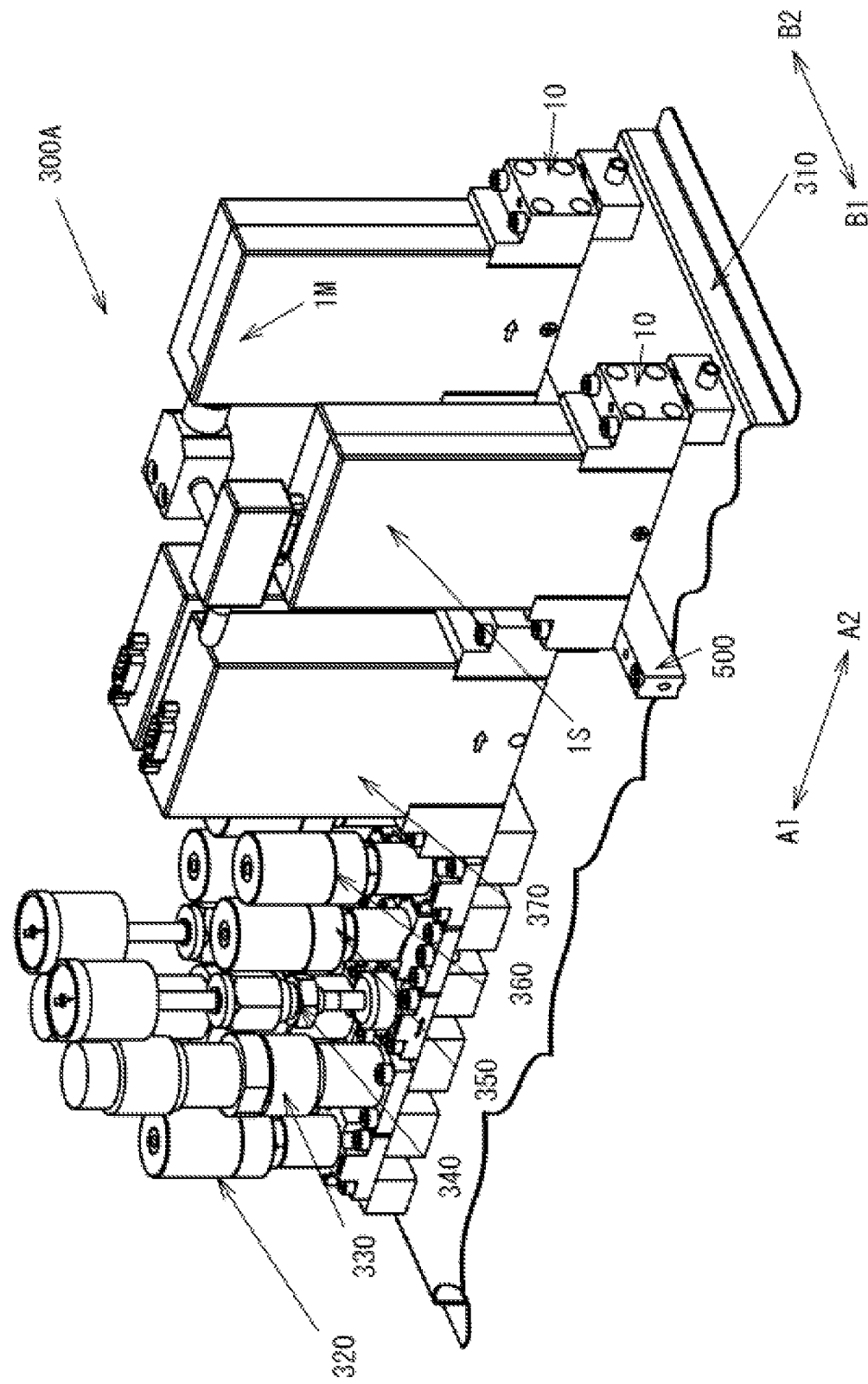
[Fig. 8A]

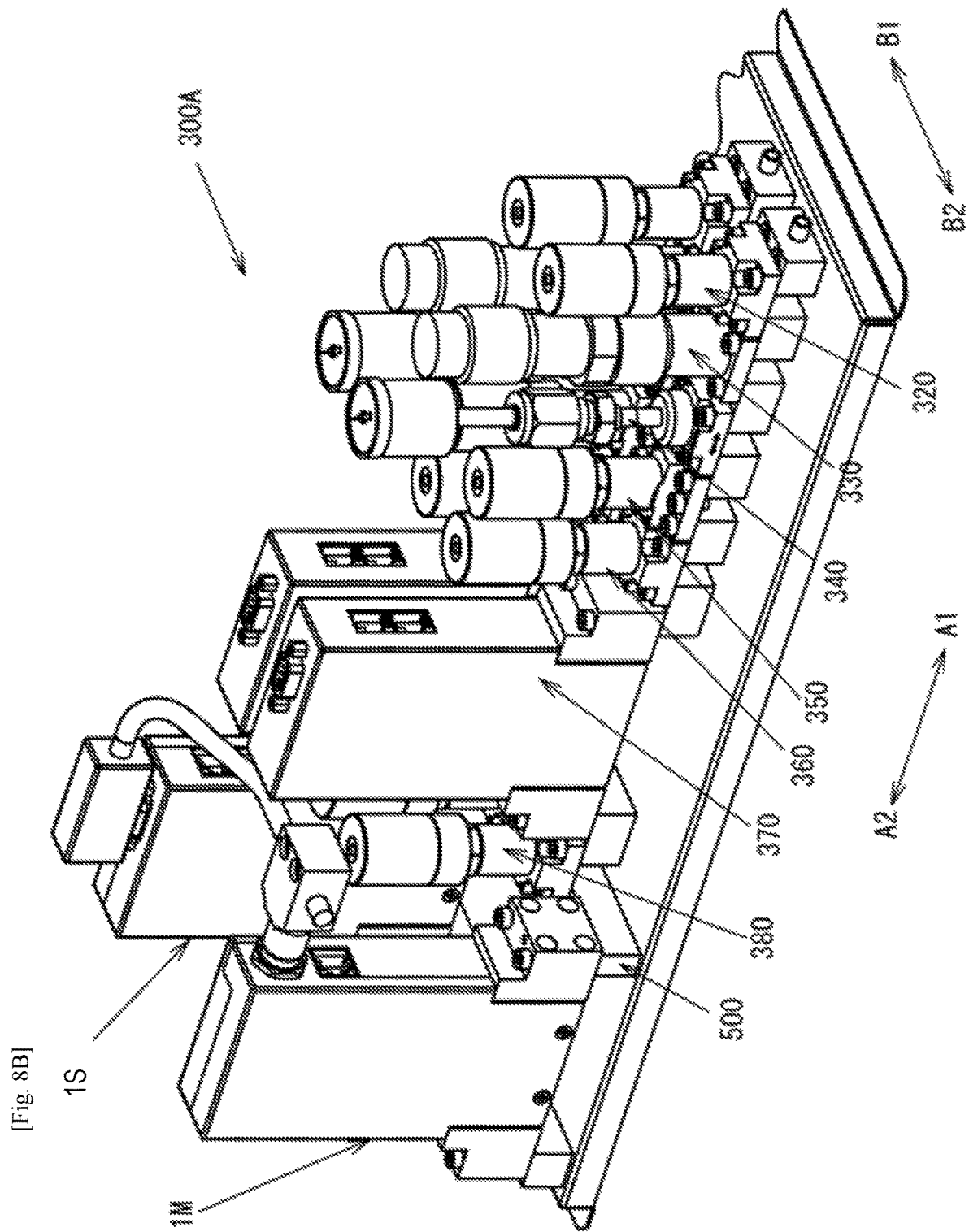

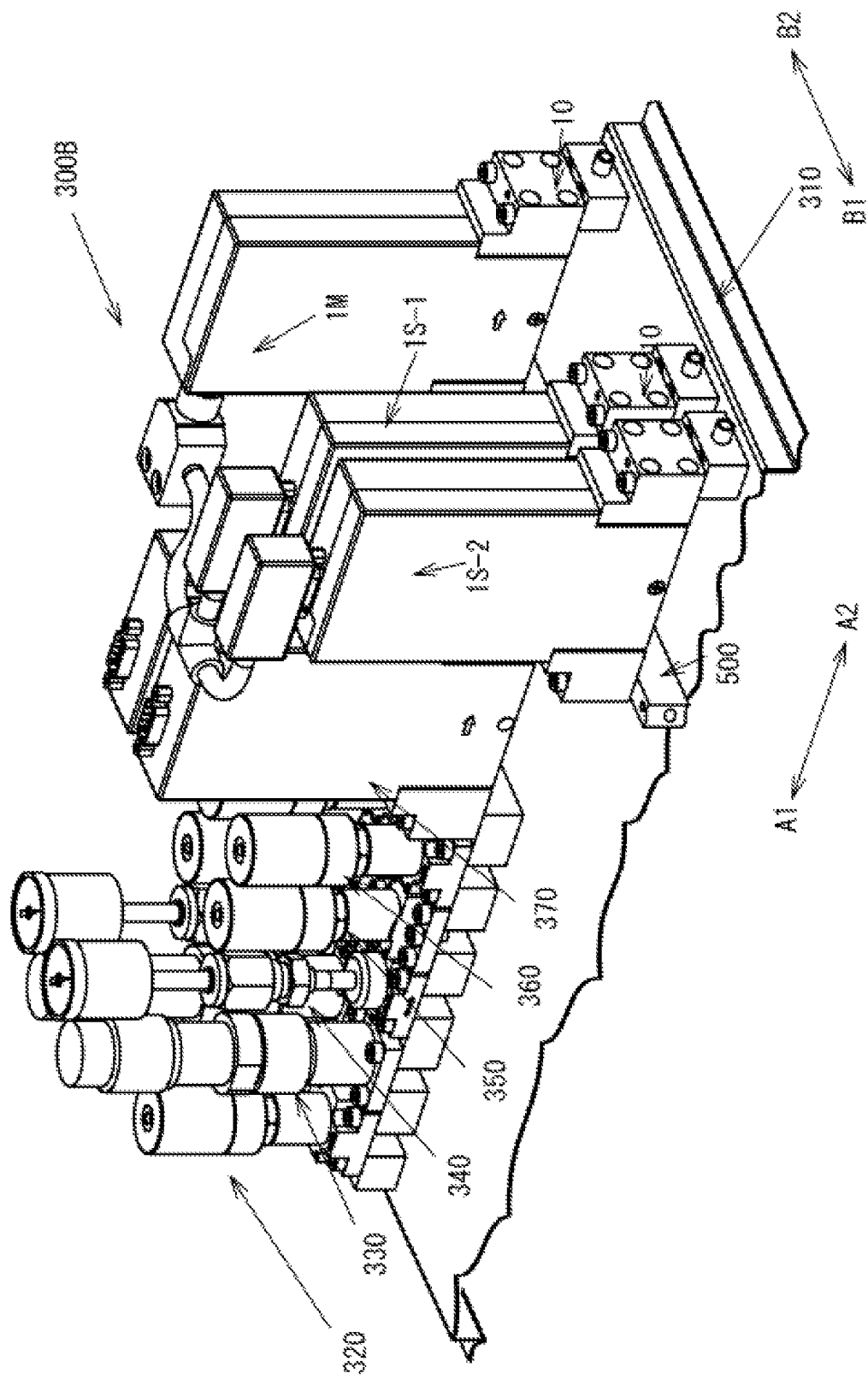
[Fig. 9A]

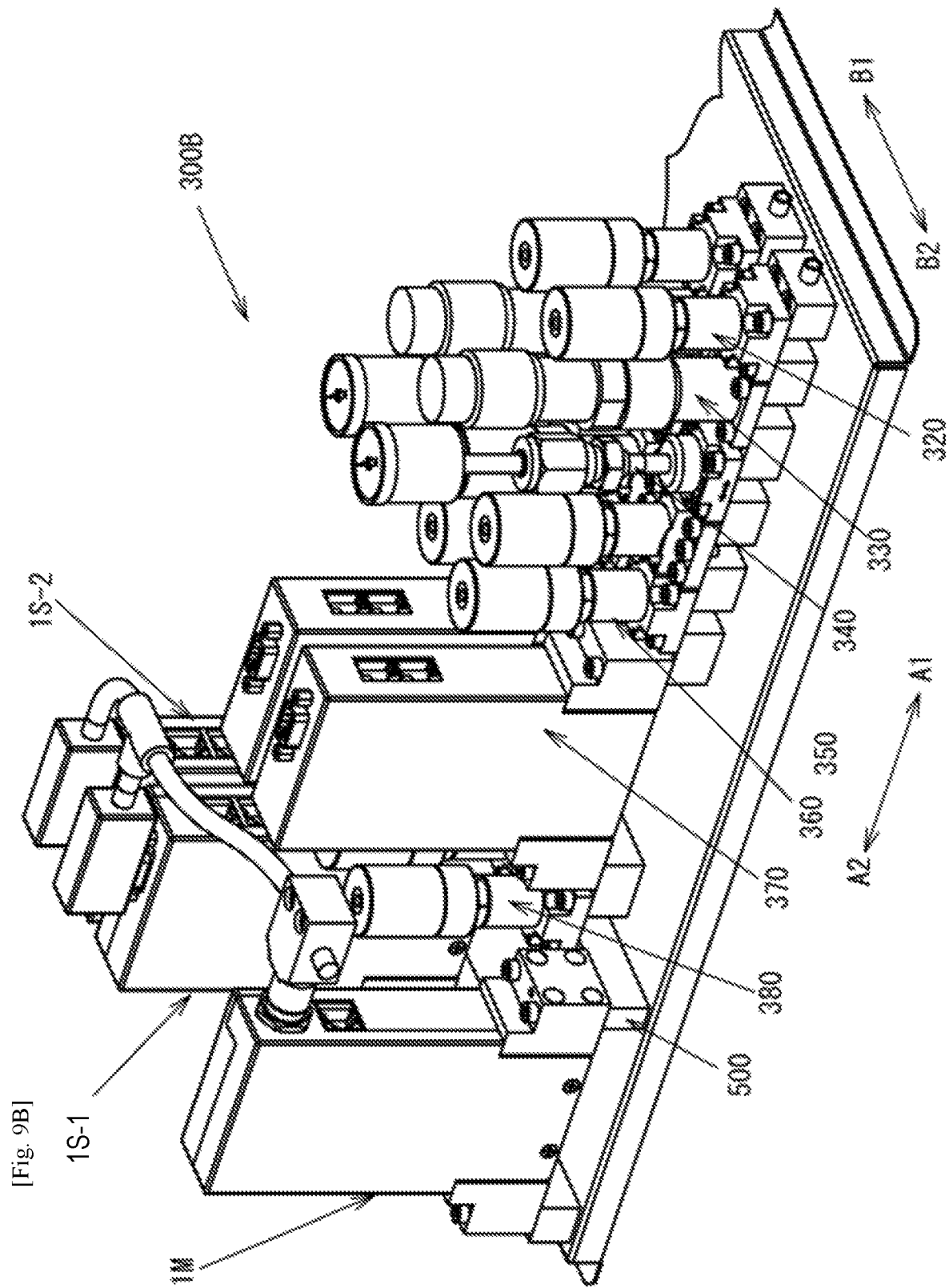
[Fig. 9B]

FLOW DIVIDING SYSTEM

BACKGROUND OF THE INVENTION

Field of the Invention

The present invention relates to a flow dividing system, a fluid control device used therein, a fluid control system to which the flow dividing system is applied, and a method for manufacturing this fluid control system.

Description of the Background Art

In a semiconductor manufacturing process, a fluid control system in which various fluid control devices, such as a switch valve and a mass flow controller, are integrated and housed inside a box is used to supply a processing gas that was accurately measured to a process chamber (refer to Patent Document 1, for example). The box that houses such an integrated fluid control system is called a gas box, and the processing gas that was accurately measured is output from an outlet of this gas box.

Furthermore, in a semiconductor manufacturing process, a flow dividing system is used to evenly distribute the processing gas that was accurately measured as described above into a plurality of process chambers or at predetermined ratios into a plurality of locations of a single process chamber (refer to Patent Document 2, for example).

In prior art, the outlet of the above-described gas box is connected to an inlet of the flow dividing system via a tube, and the processing gas supplied from the gas box is distributed.

PATENT DOCUMENTS

Patent Document 1: Japanese Laid-Open Patent Application No. 2012-197941
Patent Document 2: Japanese Laid-Open Patent Application No. 2003-263230

SUMMARY OF THE INVENTION

Problems to be Solved by the Invention

In prior art, the flow dividing system connected to the gas box is used as a dedicated flow dividing system corresponding to the number of distributions.

As a result, the problem arises that a dedicated flow dividing system needs to be prepared for each set of required specifications, increasing costs. Further, because the device is a dedicated product corresponding to the number of distributions, the problem also arises that, when a fault occurs in the flow dividing system, the entire device needs to be replaced, increasing maintenance costs as well. For example, according to the techniques of Patent Document 1 and the like, the specifications of a base portion of each fluid control device are standardized, and the connections between the fluid control devices as well as the connections between each fluid control device and other parts are each made by a joint member having a block shape, without the use of a tube. Inside the gas box, integration is achieved and the interface between each of the fluid control devices and joint members is standardized, shortening the time required for assembly and advancing assembly automation. Conversely, in the flow dividing system, a tube is used to connect the gas box to the system, increasing assembly man-hours and making assembly automation difficult.

Additionally, even when the flow dividing system is preferably disposed near a plurality of supply positions of the processing chamber, tubes are required between the flow dividing system and each supply position when the plurality of supply positions are spaced apart. That is, according to the flow dividing system of prior art, it is difficult to set the supply positions and supply orientations as desired, resulting in a low degree of freedom in arrangement.

It is therefore an object of the present invention to provide a flow dividing system that improves a degree of freedom in arrangement, allowing a supply position and a supply direction of a fluid to be set as desired without the addition of a tube between the flow dividing system and a gas supply position.

Further, an object of the present invention is to provide a flow dividing system that is suitable for integration and reduces manufacturing costs and maintenance costs, and a fluid control device used in this flow dividing system.

Furthermore, an object of the present invention is to provide a semiconductor manufacturing method that uses the above-described flow dividing system.

Means for Solving the Problems

A flow dividing system according to the present invention is a system for dividing a single flow rate into a plurality of flow rates, and controlling respective flow rates so that a ratio between the divided flow rates becomes a preset flow ratio, the flow dividing system comprising:
a branching mechanism for dividing the single flow rate into the plurality of flow rates; and
a plurality of fluid control devices that are formed as separate bodies from the branching mechanism, respectively control the plurality of flow rates, and are separated from and independent of each other.

The plurality of fluid control devices includes one master device, with the remainder being slave devices.

The master device comprises a communication unit for transmitting a preset flow rate value on the basis of the preset flow ratio to the slave device and receiving a flow rate detection value from the slave device.

The slave device comprises a communication unit for receiving the preset flow rate value from the master device and transmitting the flow rate detection value to the master device.

Preferably, the fluid control device comprises a base portion that defines an inflow port, a flow path, and an outflow port of a single flow rate of the plurality of divided flow rates,
the base portion being formed into a block shape, and
the inflow port and the outflow port of the base portion being formed on a bottom surface serving as an installation surface.

A fluid control device according to the present invention includes the master device or the slave device used in the above-described flow dividing system.

A fluid control system according to the present invention is a system that integrates a plurality of types of fluid control devices,
the plurality of types of fluid control devices including, in part, the master device and the slave device of the above-described flow dividing system.

A method for manufacturing a fluid control system according to the present invention is a method for manufacturing a fluid control system that integrates a plurality of types of fluid control devices, the plurality of types of fluid control devices including, in part, the master device and the slave device of the above-described flow dividing system, the method comprising the steps of:

positioning a plurality of block-shaped joint members on a common base plate;

fixing each of the block-shaped joint members to the common base plate by a fastening member;

positioning a seal member around an opening formed on a top surface of each of the joint members;

positioning respective bottom surfaces of the plurality of types of fluid control devices on the respective top surfaces of the block-shaped joint members; and fixing respective base portions of the plurality of types of fluid control devices to the respective block-shaped joint members by fastening members.

A semiconductor manufacturing method according to the present invention uses the above-described flow dividing system for controlling flow ratios of a fluid used in a semiconductor manufacturing process.

A method for manufacturing a flat panel display according to the present invention uses the above-described flow dividing system for controlling flow ratios of a fluid used in a flat panel display manufacturing process.

A method for manufacturing a solar panel according to the present invention uses the above-described flow dividing system for controlling flow ratios of a fluid used in a solar panel manufacturing process.

Effect of the Invention

According to the present invention, the branching mechanism for dividing a single flow rate into a plurality of flow rates, and the plurality of fluid control devices that respectively control the plurality of flow rates are formed as separate bodies, and the plurality of fluid control devices are disposed separately from and independently of each other, thereby making it possible to set the arrangement and orientation of each of the fluid control devices as desired, significantly improving the degree of freedom in arrangement.

According to the present invention, the plurality of fluid control devices are disposed separately from and independently of each other and thus, when a fault occurs in the system or the like, the flow dividing system no longer needs to be replaced in its entirety, but rather only the faulty fluid control device needs to be repaired or replaced, making it possible to significantly reduce maintenance costs.

Further, according to the present invention, the inflow port and the outflow port are formed on the bottom surfaces of the block-shaped base portions of the plurality of fluid control devices used in the flow dividing system, making it possible to construct the flow dividing system without using tubes for joints as well as integrate the flow dividing system.

Furthermore, according to the present invention, the flow dividing system can be applied to a fluid control system that integrates the fluid control devices, facilitating automation of assembly of a fluid control system including the flow dividing system.

BRIEF DESCRIPTION OF THE DRAWINGS

FIG. 1A is a front view of a master-side fluid control device according to an embodiment of the present invention.

FIG. 1B is a side view of the master-side fluid control device in FIG. 1A.

FIG. 1C is a diagram illustrating an internal structure of the master-side fluid control device in FIG. 1A with a cover thereof removed, and a vertical section of a base portion.

FIG. 1D is a bottom view of the base portion of a slave-side fluid control device in FIG. 2A.

FIG. 2A is a front view of the slave-side fluid control device according to an embodiment of the present invention.

FIG. 2B is a side view of the slave-side fluid control device in FIG. 2A.

FIG. 2C is a diagram illustrating an internal structure of the slave-side fluid control device in FIG. 2A with a cover thereof removed, and a vertical section of the base portion.

FIG. 3A is an external perspective view of a fluid control system including a flow dividing system according to an embodiment of the present invention.

FIG. 3B is an external perspective view of the fluid control system in FIG. 3A, from another direction.

FIG. 4A is a perspective view illustrating an example of a manifold block joint.

FIG. 4B is a perspective view of the manifold block joint in FIG. 4A, from another direction.

FIG. 4C is a vertical section view of the manifold block joint in FIG. 4A.

FIG. 5 is an external perspective view of a block-shaped joint member.

FIG. 6 is a functional block diagram of a flow dividing system according to an embodiment of the present invention.

FIG. 7 is an external perspective view for explaining a method for manufacturing (assembling) a fluid control system according to the present invention.

FIG. 8A is an external perspective view illustrating a modification of the fluid control system according to an embodiment of the present invention.

FIG. 8B is an external perspective view of the fluid control system in FIG. 7A, from another direction.

FIG. 9A is an external perspective view illustrating another modification of the fluid control system according to an embodiment of the present invention.

FIG. 9B is an external perspective view of the fluid control system in FIG. 8A, from another direction.

DESCRIPTION OF THE PREFERRED EMBODIMENTS

Below is described an embodiment of the present invention with reference to the drawings.

A first fluid control device (hereinafter "master device") 1M for a flow dividing system according to an embodiment of the present invention is shown in FIGS. 1A to 1D, and a second fluid control device (hereinafter "slave device") 1S for the flow dividing system is shown in FIGS. 2A to 2C.

The master device 1M comprises a base portion 10, a control valve 30 and a flow rate sensor 40 provided on the base portion 10, a cover 2 for covering these, and a circuit board 12M fixed to an inner wall of the cover 2.

The control valve 30 comprises a drive unit 31, a flange portion 32, and a valve portion 33. The valve portion 33 is housed in a recessed portion 10m formed in the base portion 10, and the flange portion 32 is fixed to the base portion 10 by bolts.

The base portion 10 is formed by coupling three base blocks 11A, 11B, 11C to each other by bolts (not illustrated).

Inflow ports 10a, 10g are formed on a bottom surface 10j of the base portion 10, and a gasket seat 10s is formed around each of the inflow ports 10a, 10g.

Flow paths 10b, 10c, 10d, 10e, 10f that communicate with the inflow port 10a are formed in the interior of the base portion 10. The flow paths 10b, 10c, 10d are connected to each other, and the flow path 10d communicates with an inlet side of the valve portion 33 of the control valve 30 on one end. The flow path 10e communicates with an outlet side of the valve portion 33 on one end, and with the flow path 10f on the other end.

The flow rate sensor 40 measures the flow rate of a fluid such as a liquid or a gas that flows through a bypass flow path 10k formed in the base portion 10. The bypass flow path 10k is connected to the flow path 10c.

The circuit board 12M comprises a function for generating a control signal output to the control valve 30, a function for sending and receiving various data between an external controller and the slave device 1S, and a function for calculating a preset flow rate provided to the master device 1M and the slave device 1S on the basis of a preset flow ratio, a function for receiving a detected signal of a flow rate sensor, and the like, and comprises hardware such as a printed circuit board and a microprocessor (not illustrated) mounted thereto, and required software. A modular jack 13A is connected to the circuit board 12M, allowing communication with a personal computer and various initial settings and the like of the master device 1M.

A communication cable 20 is used for serial communication between and power supply to the master device 1M and the slave device 1S, and a communication cable 21 is used for serial communication between and power supply to the master device 1M and an external controller (not illustrated). One end of each of the communication cables 20, 21 is connected to a connector 15A. The connector 15A is provided on the cover 2 side and connected to a connector 15B electrically connected to the circuit board 12M. As a result, the communication cable 20 is electrically connected to the circuit board 12M.

The slave device 1S has a configuration substantially similar to that of the master device 1M, as illustrated in FIGS. 2A to 2C. It should be noted that, in FIGS. 2A to 2C, the same components are denoted using the same reference numbers.

The slave device 1S can communicate with the master device 1M via the communication cable 20 by the connection of a connector 16B connected to the communication cable 20 to a connector 16A coupled to a circuit board 12S. Modular jacks 13B, 13C have the same function as that of the modular jack 13A described above.

FIGS. 3A and 3B illustrate a fluid control system including a flow dividing system configured using the master device 1M and the slave device 1S described above.

The flow dividing system according to this embodiment comprises the master device 1M, the slave device 1S, a manifold block joint member 500, and block-shaped joint members 510.

Here, FIGS. 4A to 4C illustrate the structure of the manifold block joint member 500.

The manifold block joint member 500 is a block member having a rectangular-shaped cross section along a longitudinal direction. A flow path 501 is formed in the longitudinal direction in the interior of the manifold block joint member 500. Both ends of the flow path 501 are closed. A branching flow path 503 is formed branching in a direction orthogonal to the flow path 501, and opens at a top surface of the manifold block joint member 500. The openings of the branching flow path 503 are arranged at an equal interval in the longitudinal direction. A gasket seat 505 is formed around each of the openings of the branching flow path 503. A screw hole 507 is formed on both sides of each opening of the branching flow path 503.

The manifold block joint member 500 discharges a fluid, which is supplied from one of the plurality of openings of the branching flow path 503, from the other two or more openings of the branching flow path 503, thereby making it possible to divide a single flow rate into a plurality of flow rates. For example, when a single flow rate is divided into two flow rates, the fluid is made to flow into one of the openings of the branching flow path 503 and then discharged from the other two openings of the branching flow path 503. At this time, the remaining unused openings of the branching flow path 503 are closed by a stop plug or valve (not illustrated). According to the manifold block joint member 500, it is possible to introduce and discharge the fluid at desired positions and, by selecting the number of openings to be used, divide a single flow rate into a desired number of flow rates.

The base portions 10 of the master device 1M and the slave device 1S are fixed to the manifold block joint member 500 by bolts. The flow paths 10b that communicate with the inflow ports 10a of the bottom surfaces 10j of the master device 1M and the slave device 1S are connected to the branching flow path 503 that opens to a top surface of the manifold block joint member 500.

FIG. 5 illustrates the outer appearance of the block-shaped joint member 510.

The block-shaped joint member 510 comprises an opening 510a formed on a top surface and an opening 510b formed into a cylindrical shape on a side surface. The opening 510a and the opening 510b are communicated by a single flow path (not illustrated) formed in the interior of the block-shaped joint member 510. A gasket seat 510c for housing a gasket is formed around the opening 510a. A screw hole 510d formed in a vertical direction is formed on both sides of the gasket seat 510c. A bolt for fixing the base portion 10 described above to the block-shaped joint member 510 is screwed into each of the screw holes 510d. A through hole 510e is formed in a vertical direction near each of the screw holes 510d. The through hole 510e is provided for a bolt for fixing the block-shaped joint member 510 to a base plate 310 and, while not described in detail, is counterbored.

The base portions 10 of the master device 1M and the slave device 1S are fixed to the block-shaped joint members 510 by bolts. The flow path with the opening 510a on the top surface of the block-shaped joint member 510 is connected to the flow path 10f with the outflow port 10g on the bottom surface 10j of the respective master device 1M and slave device 1S.

A fluid control system including the flow dividing system according to this embodiment, as illustrated in FIGS. 3A and 3B, comprises a switch valve 320, a regulator 330, a pressure gauge 340, switch valves 350, 360, a mass flow controller (MFC) 370, and a switch valve 380 in addition to the master device 1M and the slave device 1S. These are arranged in longitudinal directions A1, A2. It should be noted that, while actually the fluid control devices are arranged in horizontal directions B1, B2 orthogonal to the longitudinal directions A1, A2 as well, this is omitted for ease of explanation.

The fluid control devices 320 to 380 comprise base portions 320B to 380B formed into block shapes. These base portions 320B to 380B are formed in accordance with specifications standardized by Semiconductor Equipment and Materials International (SEMI) standards, and openings (not illustrated) through which fluid flows in and out are formed on the bottom surfaces thereof. The specifications of the base portion 370B of the MFC 370 and the external dimensions of the MFC 370 are the same as that of the master device 1M and the slave device 1S.

The respective base portions 320B to 380B of the fluid control devices 320 to 380 are installed on and fixed to block-shaped joint members 401 to 407. As mentioned, gaskets GK serving as seal members are interposed between the respective base portions 320B to 380B and block-shaped joint members 401 to 407, and the flow paths of the base portions 320B to 380B as well as the flow paths of the block-shaped joint members 401 to 407 connected thereto are sealed by the gaskets GK. The block-shaped joint member 401 has the same structure as that of the block-shaped joint member 510 described above, and introduces the fluid supplied from an inflow port 401b to the switch valve 320. The other block-shaped joint members 402 to 407 connect the flow paths of the fluid control devices 320 to 380.

FIG. 6 illustrates a functional block diagram of an example of a flow dividing system configured using the master device 1M and the slave device 1S.

As illustrated in FIG. 6, the master device 1M comprises a control unit 103M, a driver 104M, a communication unit 102M and a flow rate calculating unit 105 in addition to the control valve 30 and the flow rate sensor 40.

The control unit 103M of the master device 1M fixes the aperture of the control valve 30 to, for example, fully open or a constant 75%.

The flow rate calculating unit 105 receives a preset flow ratio TFR (%) from an external controller 200 via the communication unit 102M, and calculates preset flow rate values TRM and TRS corresponding to the preset flow ratio TFR. The preset flow rate value TRM is the preset (target) flow rate value of the master device 1M. The preset flow rate value TRS is the preset (target) flow rate value of the slave device 1S. The preset (target) flow rate value of the slave device 1S is transmitted to a communication unit 102S of the slave device 1S via the communication unit 102M.

A control unit 103S of the slave device 1S generates and provides to a driver 104S a control command corresponding to a deviation between a flow rate Q2 equivalent to a detected value DQ2 of the flow rate sensor 40, and the preset flow rate value TRS provided via the communication units 102M, 102S. The driver 104S provides a driving current corresponding to the received control command to the drive unit of the control valve 30.

Furthermore, the flow rate calculating unit 105 receives a detected value DQ1 of the flow rate sensor 40 of the master device 1M and receives the detected value DQ2 of the flow rate sensor 40 of the slave device 1S via the communication units 102S, 102M, and continually updates and outputs the preset flow rate TRS equivalent to the preset flow ratio TFR. As a result, even if there is fluctuation in a flow rate Q on a primary side, the ratio between the flow rates Q1, Q2 on a secondary side can be continually maintained as constant.

The communication units 102M, 102S serially communicate various data, such as the detected value DQ2 of the flow rate sensor 40 and the preset flow rate TRS, between the master device 1M and the slave device 1S. It should be noted that, while the cable 20 is used for communication in this embodiment, serial communication can be performed wirelessly as well.

An example of a method for manufacturing (assembling) a fluid control system according to the present invention is described below with reference to FIG. 7.

Screw holes for fixing the block-shaped joint members 401 to 407, 510 by bolts BT1 are formed in advance in predetermined positions of the base plate 310, the block-shaped joint members 401 to 407, 510 are positioned in the formed positions of these screw holes, and the manifold block joint 500 is positioned in a predetermined position.

Next, the bolts BT1 are inserted into the respective through holes of the block-shaped joint members 401 to 407, 510, and the block-shaped joint members 401 to 407, 510 are fastened to the base plate 310. In this state, the top surfaces of the block-shaped joint members 401 to 407, 510 and the manifold block joint 500 are on a common plane.

Next, the gaskets GK are positioned in suitable locations of the block-shaped joint members 401 to 407, 510 and the manifold block joint 500. (The gaskets GK may also be attached to the fluid control devices 320 to 380, the master device 1M, and the slave device 1S in advance.)

Next, the fluid control devices 320 to 380, the master device 1M, and the slave device 1S are positioned on the top surfaces of the block-shaped joint members 401 to 407, 510 and the manifold block joint 500 with the gaskets GK interposed therebetween.

Next, using bolts BT2, BT3, the fluid control devices 320 to 380, the master device 1M, and the slave device 1S are fastened to the block-shaped joint members 401 to 407, 510 and the manifold block joint 500.

Next, the master device 1M and the slave device 1S are connected by the communication cable 20.

With the above steps, the assembly of the fluid control system is completed.

According to this embodiment, the flow dividing system is constructed using components (the master device 1M, the slave device 1S, and the manifold block joint 500) separated by function, making it possible to use general-purpose parts for components and reduce manufacturing costs.

Further, when a fault occurs in the flow dividing system or the like, only the faulty component needs to be repaired or replaced, making it possible to reduce the costs required for maintenance as well.

According to this embodiment, communication is enabled between the master device 1M and the slave device 1S, making it possible to set the relative positions of the master device 1M and the slave device 1S as desired and make the discharge position of the fluid after division variable, thereby increasing the degree of freedom in system design.

According to this embodiment, each element of the fluid control system including the flow dividing system is coupled using a block-shaped interface, making it possible to improve system integration.

According to this embodiment, each element of the fluid control system including the flow dividing system is stacked on the base plate 310 and assembly can be performed by screwing all bolts in the same vertical direction, making assembly automation extremely easy.

Modifications

FIGS. 8A and 8B illustrate a modification of the fluid control system according to the present invention.

In the fluid control system illustrated in FIGS. 8A and 8B, the rows of the fluid control devices, each including the switch valve 320, the regulator 330, the pressure gauge 340, the switch valves 350, 360, the mass flow controller (MFC) 370, and the switch valve 380, arranged in directions A1, A2 are in parallel. The master device 1M is disposed on the B2 direction side and the slave device 1S is disposed on the B1 direction side with respect to the two rows of fluid control devices. The flow dividing system comprising the master device 1M and the slave device 1S divides the fluid from, among the plurality of rows of fluid control devices, a single row or a plurality of the rows.

FIGS. 9A and 9B illustrate yet another modification of the fluid control system according to the present invention.

The fluid control system illustrated in FIGS. 9A and 9B comprises two slave devices 1S-1, 1S-2, and divides a single flow rate into three. The fluid control system illustrated in FIGS. 9A and 9B can be easily constructed by newly adding the slave device 1S-2 to the fluid control system illustrated in FIGS. 8A and 8B and connecting the slave device 1S-2 using a communication cable.

While in the above embodiment the manifold is configured using the manifold block joint member 500, the present invention is not limited thereto, and various modes may be utilized as necessary.

While in the above embodiment a description is given using an example in which the flow dividing system is disposed in a gas box, the present invention is not limited thereto. For example, the flow dividing system may be provided outside the gas box, and the outlet of the gas box and each of the fluid control devices may be connected by a branching flow path, distributing each of the fluid control devices to target supply positions. Further, the orientations when arranging each of the fluid control devices can also be set as desired. Furthermore, the outflow ports and the inflow ports can be provided on the side surface sides of the base of each of the fluid control devices, and a pipe connector can be used as a joint.

While the flow dividing system described above is applied to a semiconductor manufacturing process, the present invention is not necessarily limited thereto, allowing application to various other manufacturing processes, such as a flat panel display manufacturing process and a solar panel manufacturing process.

DESCRIPTIONS OF REFERENCE NUMERALS

1M Master device
1S Slave device
2 Cover
10 Base portion
11A, 11B, 11C Base block
15A, 15B Connector
20, 21 Communication cable
300, 300A, 300B Fluid control system
310 Base plate
320 Switch valve
330 Regulator
340 Pressure gauge
350 Switch valve
360 Switch valve
370 Mass flow controller
380 Switch valve
401 to 407 Block-shaped joint member
500 Manifold block joint member (Branching mechanism)
510 Block-shaped joint member
BT1 to BT3 Bolt (Fastening member)
GK Gasket

What is claimed is:

1. A flow dividing system for dividing a single flow rate into a plurality of flow rates, and controlling respective flow rates so that a ratio between the divided flow rates becomes a preset flow ratio, the flow dividing system comprising:
   a branching mechanism configured to divide the single flow rate into the plurality of flow rates;
   a plurality of fluid control devices respectively configured to control the plurality of flow rates, said plurality of fluid control devices being formed as separate bodies from the branching mechanism, the plurality of fluid control devices being separated from and independent of each other;
   the plurality of fluid control devices comprising one master device, with the remainder being a slave device;
   the master device comprising a communication unit configured to transmit a preset flow rate value on the basis of the preset flow ratio to the slave device and configured to receive a flow rate detection value from the slave device; and
   the slave device comprising a communication unit configured to receive the preset flow rate value from the master device and configured to transmit the flow rate detection value to the master device, wherein
   each of the master and slave devices comprise as part thereof a base portion that defines an inflow port, a flow path, and an outflow port of a single flow rate of the plurality of divided flow rates,
   the base portion is formed into a block shape, and the inflow port and the outflow port of the base portion are formed on a bottom surface serving as an installation surface,
   the branching mechanism comprises a first block-shaped joint member that divides a single flow rate into a plurality of flow rates, the first block-shaped joint member comprising a top surface with a plurality of openings arranged therein,
   an interior of said branching mechanism provides a plurality of branching flow paths that respectively communicate with the plurality of openings, and a common flow path with the plurality of branching flow paths commonly connected thereto,
   each of the plurality of openings being directly connectable from the top with a respective one of the inflow ports of the master and slave devices and an outflow port of an upstream device, and
   the base portions of the master device and the slave device are each fixed to the first block-shaped joint member by fastening members, and each of the flow paths communicating with the inflow ports on the bottom surfaces of the master device and the slave device is connected to the flow path communicating with the openings on the top surface of the block-shaped joint member.

2. The flow dividing system according to claim 1, wherein the master device comprises a flow rate calculating unit configured to calculate respective preset flow rate values of the plurality of fluid control devices on the basis of the preset flow ratio provided from an external source.

3. The flow dividing system according to claim 2, wherein the flow rate calculating unit is configured to change the preset flow rate values provided to the slave device on the basis of the preset flow ratio, the flow rate detection value of the master device, and the flow rate detection value of the slave device acquired via the communication unit.

4. The flow dividing system according to claim 1, further comprising:
   a plurality of second block-shaped joint members each comprising a top surface configured to mount the bottom surface of the base portion of the master device or the slave device, the base portion being fixed thereto by fastening members; and
   the second block-shaped joint members each comprising a flow path that opens at the top surface and is connected to an outflow port on the bottom surface of the master device or the slave device.

5. A fluid control system comprising the flow dividing system according to claim 1, wherein said plurality of said fluid control devices are integrated.

6. The fluid control system according to claim 5, wherein the plurality of fluid control devices each comprise a base portion having a block shape and comprising an opening of a flow path formed on a bottom surface serving as an installation surface.

7. The fluid control system according to claim 6, wherein the plurality of fluid control devices comprise a fluid control device configured to measure a flow rate of a fluid and configured to control the flow rate, and the base portions each define an inflow port, a flow path, and an outflow port of a single flow rate of the plurality of divided flow rates, and the inflow port and the outflow port of the base portion are formed on a bottom surface serving as an installation surface.

8. A method for manufacturing a fluid control system comprising the fluid dividing system of claim 1 and that integrates a plurality of said fluid control devices, the method comprising the steps of:

positioning a plurality of block-shaped joint members including the first block-shaped joint member on a common base plate;

fixing each of the block-shaped joint members to the common base plate by fastening members;

positioning a seal member around an opening formed on a top surface of each of the joint members;

positioning respective bottom surfaces of the plurality of fluid control devices on the respective top surfaces of the block-shaped joint members; and fixing respective base portions of the plurality of fluid control devices to the respective block-shaped joint members by fastening members.

9. A semiconductor manufacturing method comprising the steps of:

selecting the flow dividing system according to claim 1;

selecting a fluid for use in manufacturing a semiconductor; and utilizing the flow dividing system to control flow ratios of said fluid to manufacture said semiconductor.

10. A method for manufacturing a flat panel display comprising the steps of:

selecting the semiconductor manufactured according to claim 9; and utilizing the semiconductor to manufacture said flat panel display.

11. A method for manufacturing a solar panel comprising the steps of:

selecting the semiconductor manufactured according to claim 9; and utilizing the semiconductor to manufacture said solar panel.

12. The flow dividing system according to claim 1, wherein the plurality of openings on the upper surface of the first block-shaped joint member is arranged linearly along the longitudinal direction, and the common flow path extends along the longitudinal direction inside the first block-shaped joint member.

13. The flow dividing system according to claim 12, wherein the first block-shaped joint member has screw holes formed on both sides of each of the plurality of openings in the longitudinal direction and extending from the upper surface towards the bottom surface to be screwed with the fastening members, and the screw holes are each closed above the common flow path.

* * * * *